United States Patent [19]
Kunz et al.

[11] Patent Number: 5,465,861
[45] Date of Patent: Nov. 14, 1995

[54] CLOSURE FOR CLOSING THE ORIFICE OF A SOCKET-PIECE

[75] Inventors: Josef G. Kunz, Rosenheim; Angelika B. M. Temmesfeld, Raubling, both of Germany

[73] Assignee: temtec Fahrzeugtechnik Entwicklungsgesellschaft mbH, Raubling, Germany

[21] Appl. No.: 164,882

[22] Filed: Dec. 9, 1993

[30]  Foreign Application Priority Data

Dec. 16, 1992 [DE]  Germany .......................... 42 42 598.0

[51] Int. Cl.⁶ .............................. B65B 3/04; B65D 51/04
[52] U.S. Cl. .................. 220/260; 220/331; 220/86.2; 141/312; 141/349
[58] Field of Search .................... 220/263, 264, 220/303, 329, 331, 333, DIG. 33, 86.2; 141/312, 348, 349

[56]  References Cited

U.S. PATENT DOCUMENTS 4,881,655  11/1989  Jansky et al. ..................... 220/209

FOREIGN PATENT DOCUMENTS 3721049  5/1989  Germany .

OTHER PUBLICATIONS

2244 Research Disclosure (1992) Ausut, No. 340, Emsworth, GB pp. 658–659.

Primary Examiner—Stephen P. Garbe
Assistant Examiner—Nathan Newhouse
Attorney, Agent, or Firm—Nields & Lemack

[57]  ABSTRACT

In a closure for closing the orifice 6 of a socket-piece 4, with a closure part 5, which is able to depart from its closure seat by swiveling, there is provided a constraining guide for the closure part 5, by means of which the closure part 5 is so guided that during the opening procedure it lifts from its closure seat in an approximately axial direction and, continuing on from this axial movement, is tilted away laterally to the outer wall. The constraining guide can consist of a coulisse guide or a lever-bar.

17 Claims, 4 Drawing Sheets

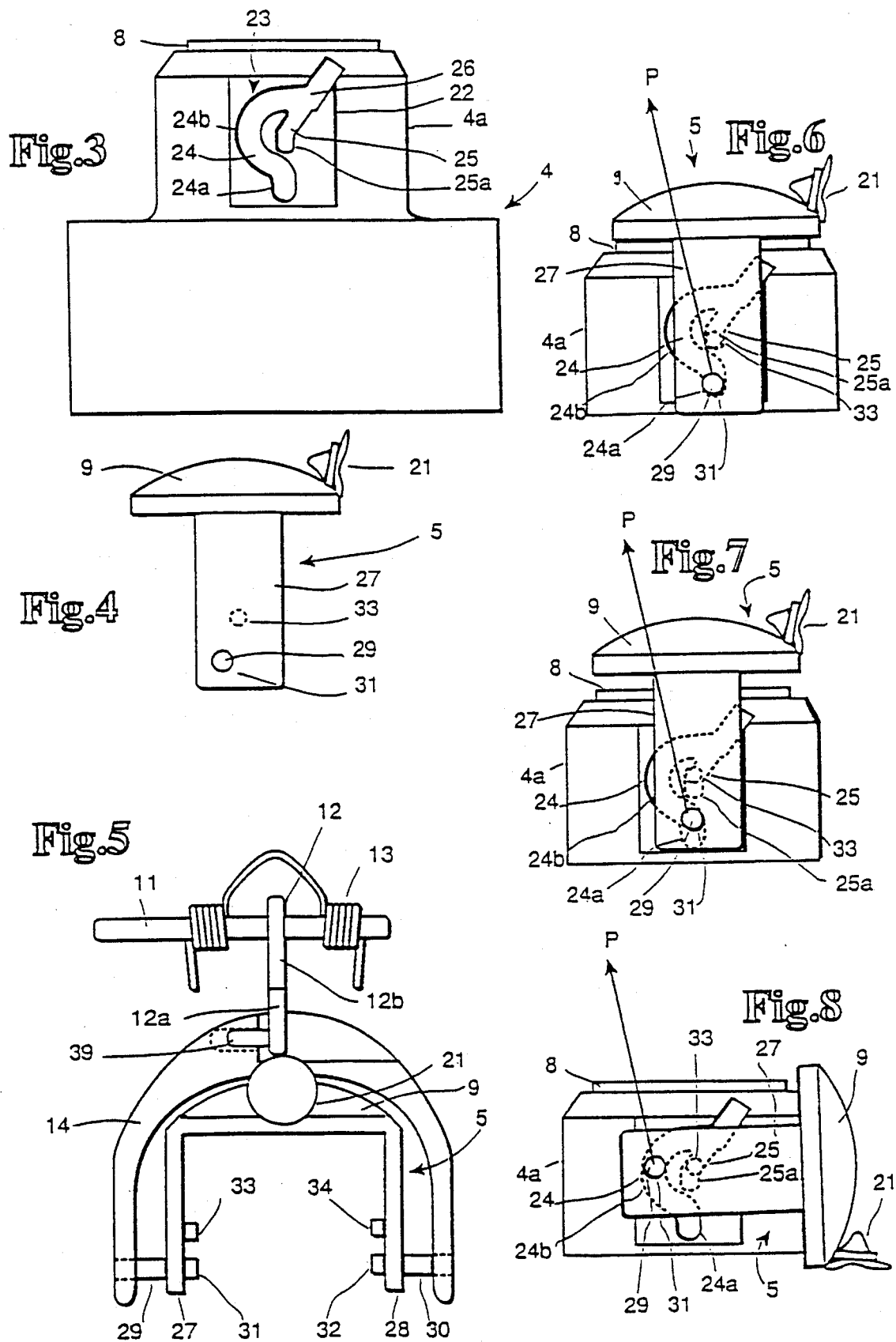

CLOSURE FOR CLOSING THE ORIFICE OF A SOCKET-PIECE

BACKGROUND OF THE INVENTION

1. Field of the Invention

The invention relates to a closure for closing the orifice of a socket-piece, with a closure part which is able to depart from its closure seat by swiveling.

2. Description of Related Art

A closure of the foregoing type is, for example, known from DE-A-37 21 049.1. Known closures of this type usually exhibit a flap, which closes the orifice opening of a socket-piece (e.g. a petrol pour-in socket-piece of a motor vehicle) "from the inside out". By introducing a refueling nozzle or the like the closure flap can be swiveled away against the force of a spring in the direction of the interior of the socket piece. If, in such a closure during the time in which the closure part sits on the closure seat and the closure is shut, dirt, as for example leaf residue, pine needles or the like accumulates, this dirt can gain access to the interior of the socket-piece upon pushing open the closure flap. Upon re-closing, this dirt residue reaches possibly between the closure part and the closure seat and thus prevents the tight connection between the two parts.

SUMMARY OF THE INVENTION

The invention is based upon the task of forming a closure of the hereinabove mentioned type in which it is ensured as much as possible that upon opening of the closure part no dirt particles gain access to the interior of the socket-piece.

This task is solved, in that a constraining guide for the closure part is provided, by means of which the closure part is so guided that upon the opening process it is lifted from its closure seat in a nearly axial direction and, continuing on from this axial movement, tilted away to the side.

By means of the measures according to the invention the possibility is created, that the closure part can cover the orifice rim of the socket-piece from the outside, so that the packing location between the orifice rim and the closure part is protected from soiling. Since the closure part in the constraining guide is so guided that it first lifts upon the opening movement and, continuing on from this lifting movement, is tilted away laterally to the outer side of the socket-piece, dirt that at times accumulates on the closure part is thrown to the side equally with the tilting movement. Different from closure flaps according to the state of the art which usually are tilted in the interior of the socket-piece during the opening process, in the case of the closure according to the invention it is nearly excluded that dirt gains access to the interior of the socket-piece or in the region of the closure seat.

According to an advantageous embodiment the constraining guide is a coulisse guide, which consists of two complementary parts, namely, on the one hand of grooves and on the other hand pegs which interlock with the grooves.

According to a further advantageous embodiment of the invention it is provided that each coulisse guide exhibits two grooves, in which at any given time guide pegs interlock, and that both grooves at any given time exhibit a somewhat axial-rectilinear-running segment, and one of the two grooves exhibits a circular-arc-form segment joined on to the axial-running segment. Such a coulisse guide makes possible a particularly compact method of construction.

From the viewpoint of manufacturing technique it is especially advantageous, if the two named grooves run together into a threading-groove, so that the complementary part, which exhibits the pegs, can be introduced via this threading groove when the closure is put together.

According to a further advantageous embodiment of the invention, it is provided that the closure part exhibits a cap which fits on the closure seat and two supports which are arranged laterally on the cap and extend in the axial direction, said cap enclosing the socket-piece on both sides in the shape of a fork. In this method of construction one can arrange at any given time one part of the coulisse guide at the outer wall of the socket piece, and arrange the part complementary thereto at any given time on the inner side of each one of the supports which faces the socket-piece. This method of construction meets in particular measure the requirement that such closures are to be constructed compact and small. Moreover, it is immaterial which one of the two complementary parts is arranged on the outer wall of the socket-piece or the inner side of the supports, respectively.

It is furthermore advantageous, if a force-receiving part is arranged on the support or on the supports, upon which forces are exercisable in approximately the axial direction for closing and opening the closure. To this force-receiving part, which may be for example a projecting peg, a frame can be connected, which is connected with an activation lever. Such an activation lever can be activated by hand, or it can also be so arranged in an introduction channel that it is activated automatically to some extent by introduction of a refueling nozzle or other filling apparatus.

In accordance with another advantageous embodiment it is nevertheless provided to connect the force-receiving part with an axially-moveable outer ring. By means of the axial movement of the outer ring, which surrounds the socket-piece, the closure part can be moved in the above-indicated manner, i.e., it is first lifted and thereafter tilted laterally. Such a closure is especially adapted to oil- or coolant-tanks, which as a rule are not filled up with a refueling nozzle. It can nevertheless find use also for other purposes, for example for uncovering of a diagnosis-connected socket.

In accordance with a further advantageous embodiment of the invention the force-receiving part is constructed as a peg, which interlocks with a circumferential groove of the axially moveable outer ring.

If the axially moveable outer ring exhibits pegs and if the outer wall of the socket-piece exhibits a screw-coulisse, in such a manner that it is displaced in the axial direction by means of a turning about its axis, this axial movement can be transferred to the force-receiving part for opening and closing of the closure part.

The screw-coulisse, which in accordance with the above-mentioned embodiment brings about the axial displacement of the outer ring, consists according to an advantageous embodiment again of two complementary parts, namely, on the one hand of grooves and on the other hand of pegs interlocking with the grooves. Advantageously in so doing the one part of the screw-connecting-link is arranged on the outer side of the socket-piece and the part complementary thereto on the inner side of the outer ring. A screw-coulisse, which altogether consists of three grooves and three pegs interlocking with the grooves, delivers a splendid guidance of the outer ring, which already produces an axial displacement as a result of a turning of less than 90 degrees, which is sufficient for the secure opening and closing of the closure part.

According to another embodiment the constraining guide is constructed as a lever-rod. A lever-rod exhibits a smaller friction compared with a coulisse guide; however, it requires as a rule more space. It is however essential that with the lever-rod also, the opening movement according to the invention (namely, first a lifting of the closure part in a somewhat axial direction and thereafter a lateral tilting away of the closure part) is possible.

According to an advantageous embodiment the lever-rod exhibits two axes of rotation, of which the first presents a spatially fixed support for the lever-rod and lies at a lateral distance from the socket-piece, and of which the second presents a point of rotation of the closure part and runs diametrically through the socket-piece in such a manner that a swiveling of the lever-rod about the first axis of rotation brings about an approximately axial lifting of the closure part, and a swiveling of the closure part about the second axis brings about a lateral tilting away of the closure part to the outer side of the socket-piece.

In order completely to separate the two movement-phases of the lifting and tilting-away, it is provided according to a further advantageous embodiment that the turning movement about the first axis of rotation is limited by a stop. If beyond this a supplemental spring is provided, which is stressed upon lateral tilting-away of the closure part, it is made certain that upon the exercise of a force on the lever-rod, first a turning movement about the first axis takes place until the stop is reached. By means of this first turning movement the closure part is somewhat axially lifted. If the first point of rotation lies very far away from the socket-piece, there results a nearly axial movement. If the axis of rotation however lies closer to the socket-piece, the axial lifting-movement is coupled with a slight tilting movement, which however is not harmful. When the stop is reached and the force operates in the axial direction further on the lever-rod, the closure part is tilted away laterally against the effect of the supplemental spring.

The closure according to the invention is especially suitable for petrol tanks, in which the socket-piece is surrounded by a structure which exhibits an inlet channel for a petrol refueling nozzle. In such tank closures there arises the problem that during the time in which the closure is closed, dirty water accumulates round about the orifice. According to an advantageous further development of the invention it is provided that the structure exhibits run-off openings which are then closed when the closure part is lifted out of its closure seat and is laterally tilted away. Thus the dirty water can run off, as long as the closure is closed. Upon filling the tank of the motor vehicle, i.e. when the closure is opened, no false air can be drawn into the gas-suck-off system of the refueling nozzle through the run-off openings, which are closed as mentioned above. Rather, only the vapors which are pushed out of the petrol tank because of the filling-up with petrol are able to reach the gas-suck-off system of the refueling nozzle.

The invention will hereinafter be explained in more detail with reference to the exemplary embodiments shown schematically in the Figures.

BRIEF DESCRIPTION OF THE DRAWINGS

FIG. 3 shows a tubular socket piece with packing and guide-coulisse in elevation.

FIG. 4 shows the closure part from FIG. 1 in elevation.

FIG. 5 shows the closure part with frame and activation lever in side view.

FIGS. 6 through 8 show the closure part arranged on the socket-piece in different phases of the opening movement.

DESCRIPTION OF THE PREFERRED EMBODIMENTS

Figure 1:
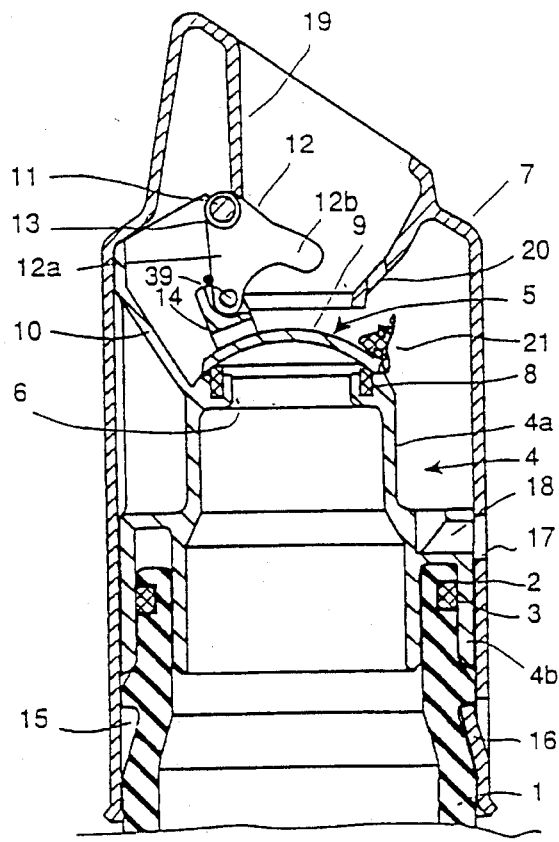
FIG. 1 shows a petrol tank closure, which is arranged on the pour-in socket-piece of a motor vehicle.

FIG. 1 shows in axial section a petrol tank closure according to the invention, which is arranged on the pour-in tube 1 which leads to the petrol tank of a motor vehicle. The pour-in tube 1 exhibits a circumferential groove at its free end, in which an O-ring is seated.

The petrol tank closure according to the invention consists of two principal parts, namely, a socket-piece 4, which exhibits an orifice closeable by a closure part 5, and a cylindrical superstructure 7.

The socket-piece 4 is essentially cylindrical and exhibits, at its end facing the pour-in tube 1, an annular reception space fitted onto the free end of the pour-in tube. Said annular reception space surrounds the free end of the pour-in tube 1 on the inside and on the outside. The already-mentioned O-ring 3 provides for a gas- and liquid-tight connection between the two parts. The outer diameter of the socket-piece at the part 4a thereof lying towards the orifice 6 is substantially smaller than at the part 4b thereof facing the pour-in tube 1. Said part 4b surrounds the pour-in tube 1.

The wall of the socket-piece 4 is strengthened in the region of its orifice, and in the strengthened wall a circumferential groove is made which is circular and open to the front side and which receives a packing 8. The packing 8 projects at the front side of the orifice rim and serves as closure seat for the closure part 5, which exhibits a dome 9 in the shape of a spherical skullcap. In the orifice region of the socket-piece a support wall 10 is formed at one side (at the left in FIG. 1), in which U-shaped excisions are provided, which serve for reception of a shaft 11. An angle-lever 12 is arranged on the shaft 11, which exhibits two lever arms 12a and 12b and is pre-stressed by a torsion spring 13 seated on the shaft 11. The arm 12a of the angle-lever 12 is connected with a frame 14, which encloses the closure part 5 on two sides (in the drawing, in front of and behind the plane of the drawing). The angle-lever 12 and the frame 14 are so connected with the closure part that, by swiveling of the angle-lever 12, the cap-shaped dome 9 is lifted from the packing 8 and can be swiveled into the lateral free space between the socket-piece 4 and the wall of the superstructure 7. In the sectional view chosen in FIG. 1 the parts for this purpose are, however, not visible, and the function will be described hereinafter in detail.

In the position shown in FIG. 1 a force in the direction towards the orifice 6 is exerted on the frame 14 by means of the angle-lever 12 which is pre-stressed via the torsion spring 13. This force is transfered from the frame 14 onto the closure part 5 and presses the latter firmly against the packing 8. Since the lever arm 12a subtends an angle lying almost at 180° with respect to the longitudinal axis of the frame 14, a great force is exerted upon the frame 14, which can be made use of for a firm pressing of the dome 9 against the packing 8.

The already-briefly-mentioned superstructure 7 is roughly cylindrical and surrounds both the pour-in tube 1 and the socket-piece 4. The pour-in tube 1 is provided with a rest-groove 15, which interlocks with the rest-latch 16 of the superstructure 7 and makes a firm connection between the pour-in tube 1 and the superstructure 7. The superstructure 7 is provided at one side with a run-off opening 17, which coincides with a corresponding radial boring 18 in the socket-piece 4. The boring 18 exhibits a bend, so that it opens in the axial direction into the space between the orifice-side part of the socket-piece 4 and the superstructure 7, and can conduct fluid, which can accumulate in the annular space between the socket-piece 4 and the superstructure 7, towards the outside via the boring 18 and the run-off opening 17. The superstructure 7 is bent over inwardly at the end thereof facing away from the pour-in tube 1, and forms a funnel-shaped guide tube 19 for the introduction of a refueling nozzle. The guide tube 19 exhibits a longitudinal slit at one side, through which the angle-lever 12, in particular the second arm 12b of the angle-lever 12, projects into the interior of the guide tube 19. In the side wall of the guide tube 19 there is provided a boring 20, through which pressurized gases can travel to the outside out of the petrol tank during refilling.

Figure 2:
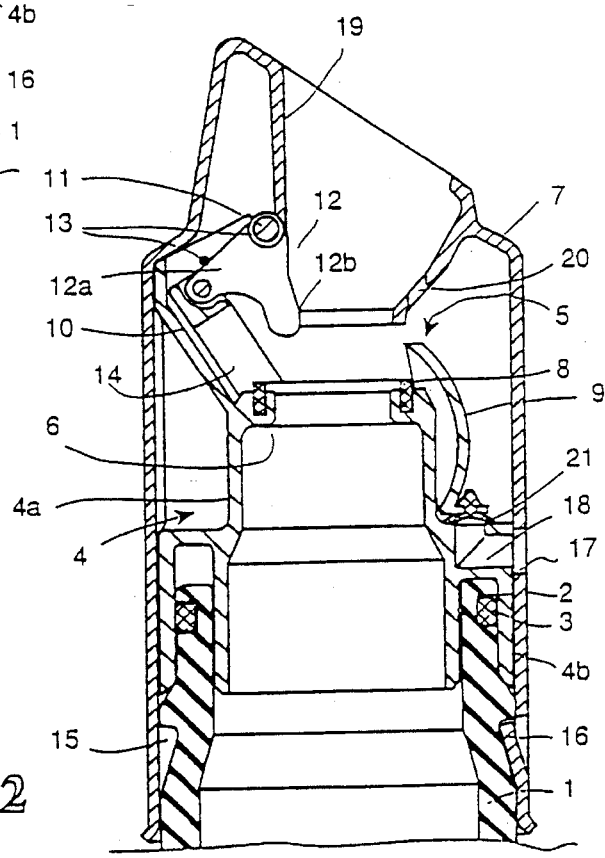
FIG. 2 shows the petrol tank closure according to FIG. 1, but with opened closure part.

FIG. 2 shows the petrol tank closure with opened closure 5. By introduction of a refueling nozzle into the guide tube 19, a force is exerted on the arm 12b of the angle lever 12, and the angle-lever is turned against the effect of the torsion spring, so that the first arm 12a of the angle-lever 12 departs from the orifice rim of the socket-piece 4 and displaces the frame 14 in a corresponding manner.

The movement is transfered (as will be explained hereinafter in detail) to the closure part 5, which first is lifted thereby a short distance in an approximately axial direction from its seal-seat and is tilted to the side, until it takes on the position shown in FIG. 2, in which the dome 9 lies at the outer side of the socket-piece 4. A packing 21 arranged at the rim of the dome 9 is thereby laid at the rim of the boring 18, and closes the boring and thus the run-off opening 17. The narrowest place of the funnel-shaped guide tube 19 is so dimensioned that a refueling nozzle is closely surrounded. Gas vapors which are pressed out of the petrol tank during refilling can then exit via the boring 20 and be sucked up by the suck-off openings of the gas-suck-off system of the refueling nozzle. Because the run-off opening 17 is closed by the packing 21 when the closure part 5 is open, no "false air" can be sucked up by the gas-suck-off system; rather, solely the vapors pressed out of the petrol tank are taken up.

During withdrawal of the refueling nozzle after refilling of the petrol tank, the angle-lever 12 is swiveled back into the position shown in FIG. 1 by operation of the torsion spring 13. As a result, the frame 14 is displaced in the direction towards the socket-piece, which leads to the back-stroke of the closure part 5. As a result, the closure part first turns back and then is pressed in an approximately axial direction upon the packing 8 at the orifice of the socket-piece 4. The closing force is progressive, since the force exerted upon the frame 14 increases in the same measure as that in which the angle between the longitudinal axis of the frame and the lever 12a approaches 180°. The cooperation between the closure part 5 and the frame 14 will be explained as follows:

In FIG. 3 the socket-piece 4 is shown in elevation. At the front side of the socket-piece facing the orifice may be recognized the circumferential packing 8. In the part 4a of the socket-piece 4 which exhibits the smaller diameter, a rectangular flattening 22 is provided at two mutually opposite sides. A guide-coulisse 23 is milled into the region of this flattening. At the other side of the socket-piece 4a there is present a guide-coulisse of identical shape, which in the drawing lies exactly "under" the guide-coulisse 23 and is coincident therewith. Since its function is the same as that of the guide-coulisse 23, hereinafter only the guide-coulisse 23 will be described. The guide-coulisse 23 consists essentially of two grooves 24 and 25. Both grooves exhibit a short rectilinear segment 24a and 25a, respectively, running in the axial direction. In the case of the first groove 24, a circular-arc-shaped segment 24b joins onto the rectilinearly running segment 24a in the direction toward the orifice of the socket-piece 4. The center of the circle of said circular-arc-shaped segment lies in the neighborhood of the end of the rectilinearly running segment 25a of the groove 25 which lies at the orifice side. Both grooves 24 and 25 run together into a threading segment 26.

The shape of the closure part 5 follows out of FIGS. 4 and 5. The closure part 5 consists, as already explained, out of a skull-cap-shaped dome 9, on the outer periphery of which two supports 27 and 28 extending in the axial direction are arranged.

On the side of the supports 27 and 28 facing outward, outer pegs 29 and 30 are arranged, which (see FIG. 5) interlock with corresponding borings of the frame 14 and make a link-connection with the frame 14. They serve as force-receiving part, via which the force exerted upon the frame is transfered to the closure part 5. The frame 14 is in connection with the arm 12a of the angle-lever 12 via the link 39, as is clear from FIG. 5. At the inner side of the supports 27 and 28 inner pegs 31 and 32 as well as 33 and 34 project. The inner peg 31 lies coaxially with the outer peg 29, while the inner peg 32 lies coaxially with the outer peg 30. In FIG. 4 the inner peg 33 is drawn in in broken lines, since it is hidden by the support 27. The inner peg 31 is, in the plane of the drawing, "below" the outer peg 29. During assembly of the apparatus the inner pegs 31 and 33 are introduced into the grooves 24 and 25 via the threading-groove 26 (see FIG. 3). The same holds true for the inner pegs 32 and 34, which run in the corresponding guide-coulisse (not shown) at the opposite side of the socket-piece 4. The location of the inner pegs 31 and 33 on the support 27 is so chosen that they correspond approximately to the relative positions of the closed ends of the groove segments 24a and 25a.

FIG. 6 shows the condition in which the closure part 5 is seated on the orifice-side part 4a of the socket-piece 4. The inner peg 33 lies in the neighborhood of the end of the groove segment 25a, while the inner peg 31 (hidden in the drawing by the outer peg 29) lies in the neighborhood of the end of the groove segment 24a. In this position the under side of the spherical skull-cap 9 lies against the packing 8. When a force is exerted upon the outer peg 29 in the direction opposite to the arrow P via the frame 14 (which is omitted in FIG. 6 for reasons of clarity), the skull-cap 9 is pressed in the axial direction against its seal-seat.

When the force direction is reversed, i.e. when one draws on the outer peg 29 via the frame 14 in the direction of the arrow P, the inner pegs 31 and 33 move in parallel in the axial direction, since they are conducted by the groove segments 24a and 25a respectively. As a result of this, the skull-cap 9 is lifted in the axial direction from its seal-seat, as follows from FIG. 7. When a force is further exerted on the outer peg 29 in the direction of the arrow P, the peg runs around again in the circular-arc-shaped groove segment 24b, while the peg 33 more or less remains in the position shown in FIG. 7. This leads to a swivel movement of the closure part about the peg 33. The result of the movement is represented in FIG. 8. The spherical skull-cap 9 is swiveled to the outer side of the socket-piece 4 and leaves the orifice free.

When the force exerted on the outer peg 29 is reversed, i.e. operates against the arrow direction, the movement is reversed, so that starting off from the position shown in FIG. 8 one again reaches the condition according to FIG. 6 (in which the skull-cap 9 lies on the packing 8 and the orifice is closed) via the condition shown in FIG. 7.

The inner pegs 31 and 33 represent a coulisse guide in cooperation with the grooves 24 and 25.

Figure 9:
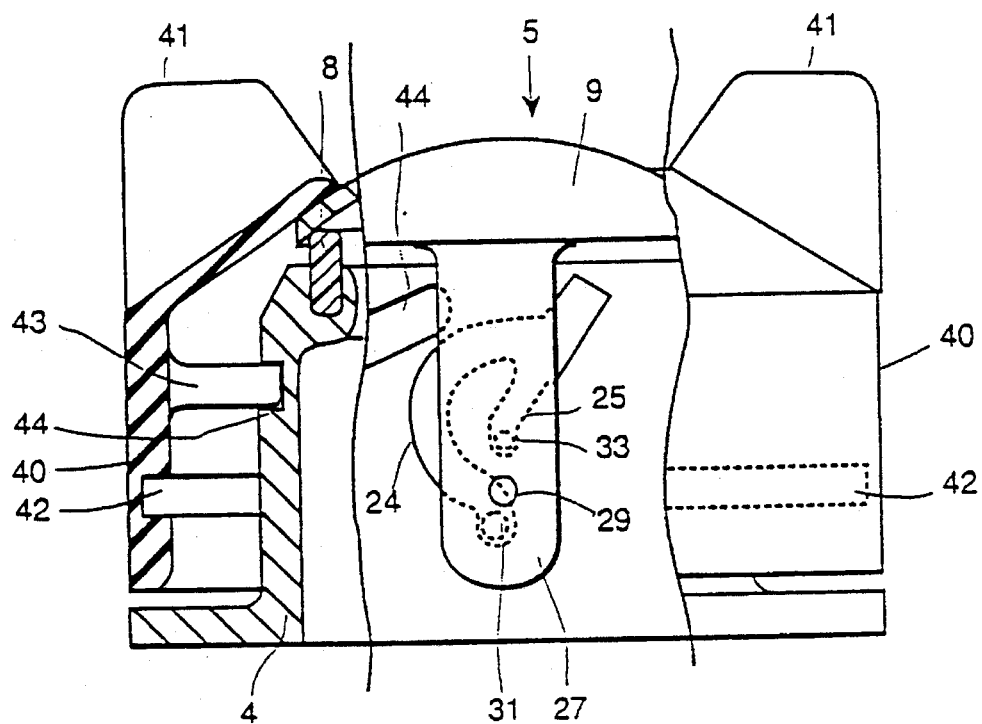
FIG. 9 shows a different embodiment of a petrol tank closure with the closure flap closed, partly in longitudinal section and partly in elevation.

In FIG. 9 a further embodiment of the invention is represented. The closure shown in FIG. 9 differs from the presently explained closure essentially in that the opening- and closing-movement of the closure part 5 is controlled by turning of a turning-ring 40. The closure is shown in the left part of FIG. 9 in axial-section representation. One may recognize a socket-piece 4, which at its orifice side exhibits a packing 8 at the front. A skull-cap-shaped closure dome 9, which is part of a closure part 5, weighs upon the packing 8 with its underside. The socket-piece 4 is concentrically surrounded by the turning-ring 40, which exhibits on its upper side two wings 41 arranged displaced by 180°. At the inner wall of the turning-ring 40 there is arranged a circumferential groove 42, which lies in a plane perpendicular to the longitudinal axis of the turning-ring. Furthermore, there are arranged at the inner side of the turning-ring 40 three pins directed radially inwardly, of which only one may be recognized in the representation of FIG. 1, namely, the pin 43. Both the other two pins, not shown, are at any given time arranged displaced by about 120°.

The pin 43 interlocks with a groove 44, which is made in the outer wall of the socket-piece 4. The groove 44 runs helically and exhibits a circumferential length of about 70°. The mentioned two further pins, which correspond to the pin 43, interlock with corresponding helical grooves, which are not shown in the drawing, and which are arranged in the outer wall of the socket-piece 4 so that at any given time they are displaced by about 120°. In the central part of FIG. 9 between the two break-off lines the closure is shown in elevation, wherein however the turning-ring 40 is broken away in the middle part of the drawing. A guide-coulisse 23 in the form of two grooves 24 and 25 is milled into the outer wall of the socket-piece 4. The shape of said grooves corresponds essentially to the shape of the grooves shown in FIG. 3. The closure part consists again of a skull-cap-shaped dome 9, on which symmetric supports are arranged at both sides. The support 27 exhibits an outwardly directed peg 29 as force-receiving part and at any given time two inwardly directed pegs 31 and 33 which interlock with the grooves 24 and 25. Except for the fact that the outer peg 29 which acts as force-receiving part, in contrast with the exemplary embodiment represented in FIGS. 3 through 8, does not swing with the inner peg 31, the construction of the closure part and of the guide-coulisse on the socket-piece 4 is identical to the construction as above explained with reference to FIGS. 3 through 8. Therewith there results also the same opening movement, namely, at first a slight somewhat axial lifting of the closure part 5 and thereafter a lateral tilting away, as this is especially shown in FIGS. 6 through 8.

In contrast to the embodiment described with reference to FIGS. 3 through 8, the outer peg 29 which acts as force-receiving part runs in the circumferential ring groove 42 of the turning ring 40. When the turning-ring 40 is turned with the aid of the wings 41 in counterclockwise direction, the pin 43 is moved in the ascending groove 44, so that the turning-ring 40 is displaced in the axial direction. Since, besides the pin 43 and the groove 44, two further pins and corresponding grooves, rotationally symmetrically displaced by 120° at any give time, are provided, the turning-ring 40 is guided precisely not only with respect to the turning movement but also with respect to the axial displacement.

Figure 10:
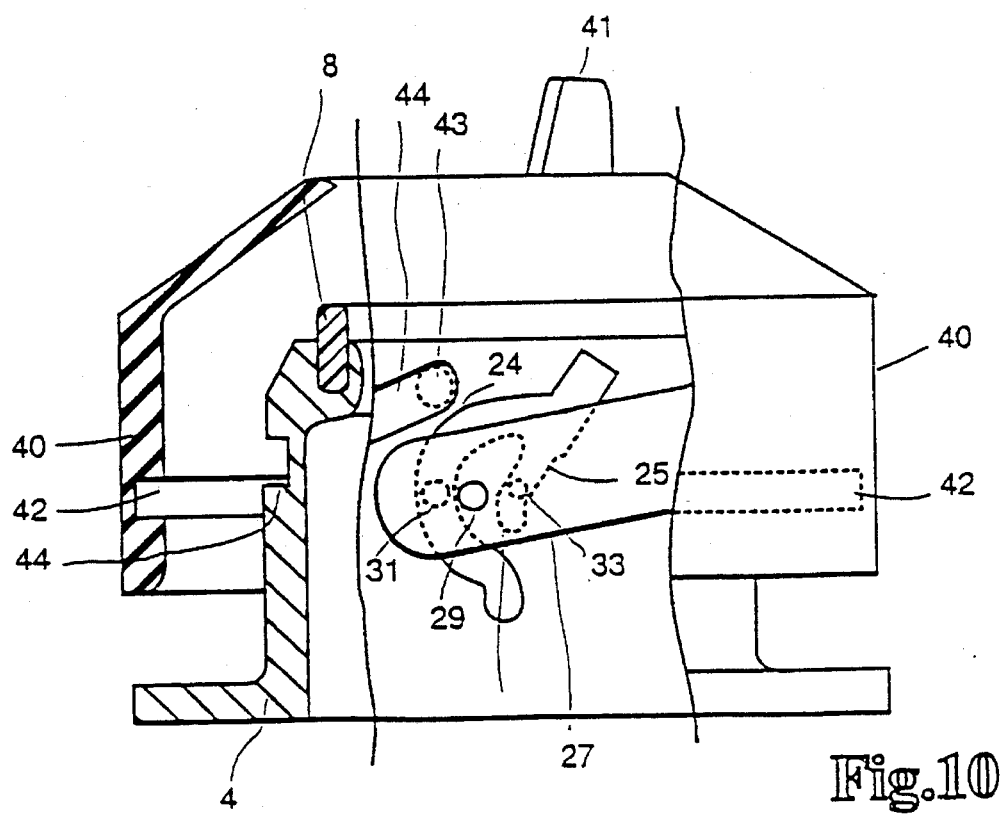
FIG. 10 shows the petrol tank closure according to FIG. 9, but with the closure part open.

The result of the turning movement is represented in FIG. 10. After a turning of about 70° the pin 43 has moved along the groove 44 and reached the end thereof. In this manner the turning-ring 40 has displaced itself in the manner of a screw axially in the direction towards the orifice of the socket-piece 4. Since the outer peg 29 on the support 27 (and correspondingly the peg, not shown, on the oppositely-disposed support) which acts as force-receiving part is guided in the circumferential groove 42, a force acting exactly in the axial direction is exerted on the outer peg.

As may be recognized in FIG. 10, the tip of the pin 43 reaches the position shown in FIG. 10 by the broken lines, which is also designated as 43. As follows equally from FIG. 10, because of the axial displacement force exerted on the outer peg 29 by operation of the coulisse guide, the support 27 is first raised in the axial direction and thereafter tilted laterally, so that the closure part carries out the same movement as shown in FIGS. 6, 7 and 8.

In order to close the closure the turning-ring 40 is turned in the clockwise direction, so that the movement runs in the opposite sequence. At the end of the turning, a force in the axial direction is exerted via the outer peg 29 upon the support 27, and thereby upon the dome 9, by which the dome 9 can be pressed firmly against the packing 8. The groove 44 (and correspondingly the further, not shown, rotationally-symmetrically-arranged groove) can be bent, in order to achieve a progressive or regressive force characteristic. At the end of the grooves there can also be provided a rest-sill, which guarantees that the pin 43 is stopped at that position in the groove 44 which guarantees a firm pressing onto the closure part 5.

Figure 11:
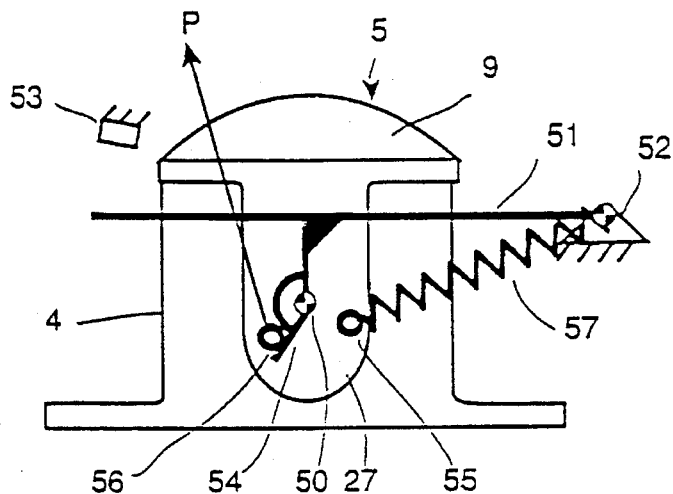
FIGS. 11 through 13 show a tank closure with a lever-rod in different phases of the opening movement.
Figure 12:
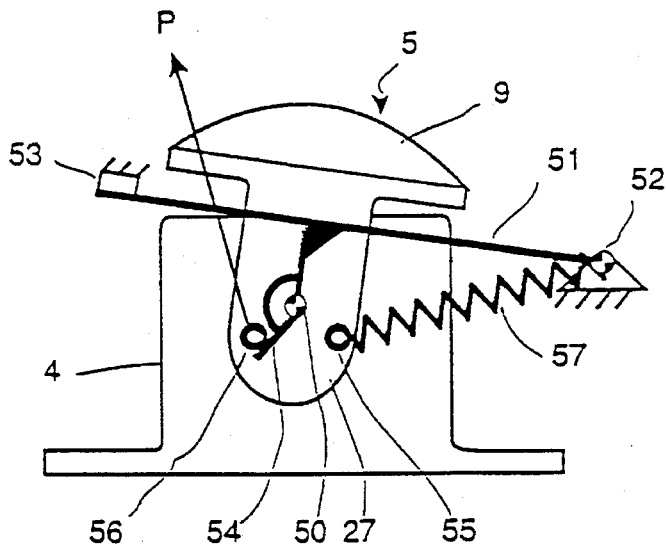
Figure 13:
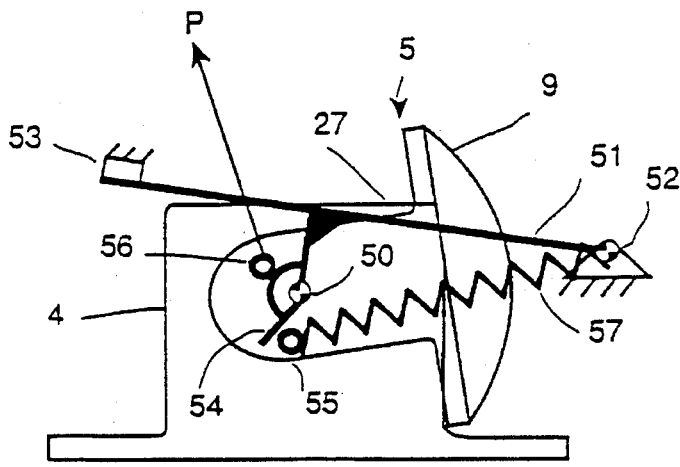

A further embodiment-variant according to the invention will hereinafter be explained with reference to FIGS. 11 through 13. The there-shown closure mechanism is suitable not only for closures which are worked via an angle-lever, as shown in FIG. 1, but also for closures which are worked via a turning-ring shown in FIG. 9. In FIGS. 11 through 13 is therefore described only the closure mechanism which differs from the previous ones. In FIG. 11 may again be recognized a socket-piece 4, which is closable by a closure part 5. The closure part 5 consists again of a skull-cap-shaped dome 9 with two supports arranged on both sides symmetrically, of which only one, namely the support 27, is to be recognized in FIG. 11. The support 27 is rotatably connected with a lever-bar 51 via an axle 50. The same is true for the support lying on the other side of the mouthpiece 4, which hereinafter will therefore not be mentioned further. The lever-bar 51 is rotatably mounted in a mount 52 outside the socket-piece 4. A stop 53 on the side opposite to the mount 52 limits the movement of the lever-bar 51. By means of a side-lever 54, which is firmly connected with the lever-bar 51, and two stop-pegs 55 and 56, which are arranged on the support 27, the turning movement of the support 27 with respect to the lever-bar 51 is limited in both directions. By means of a tension-spring 57, which is fixed on the mount 52 lying on the outside of the socket-piece 4 and on the other side on the socket 27, the support 27 is so pre-stressed in the turning direction that the peg 56 strikes against the side lever 54 of the lever-bar 51. Thereby the closure part 5 takes up the position for which the orifice of the socket-piece 4 is closed by the closure part 5.

When now a force is exerted upon the peg 56 nearly in the axial direction towards the orifice of the socket-piece 4 (arrow P), the arrangement consisting of the closure part 5 and the lever-bar 51 is swiveled about the turning-point of the mount 52. Since the turning-point lies relatively far outside the socket-piece 4, the closure part 5 is lifted from its closure seat in approximately the axial direction. The further the mount 52 is separated from the socket-piece, the more the movement approximates a pure axial movement. In practice, there results (as shown in FIG. 12) hovever a slight swivel movement of the closure part 5, which nevertheless is not harmful for the operation of the closure, so long as the swiveling results about a point which lies outside the socket-piece 4.

The phase of the opening movement shown in FIG. 12 is limited in that the lever-bar 51 strikes against the stop 53. When a force is further exerted upon the peg 56 in the direction of the arrow P or in the axial direction, the support 27 and the dome 9 connected with it are swiveled, so that the dome 9 arrives at the side of the support 4, as this is shown in FIG. 13. Since this movement must be exerted against the force of the tension-spring 57, it is first introduced when (as mentioned) the lever-bar 51 strikes against the stop 53.

When the direction of the force is reversed, i.e. when the force operates against the direction of the arrow P, the movement runs in the reverse sequence, i.e. by means of the operation of the spring 57 the closure part is swiveled back about the turning axle 50, and thereafter the lever-bar departs from the stop 53 and finally again takes up the position shown in FIG. 11.

Having thus described the principles of the invention, together with several illustrative embodiments thereof, it is to be understood that, although specific terms are employed, they are used in a generic and descriptive sense, and not for purposes of limitation, the scope of the invention being set forth in the following claims.

We claim:

1. Closure for closing the orifice (6) of a socket-piece (4) having an outer wall with a closure part (5) which is able to depart from its closure seat by swiveling, wherein a constraining guide is provided for the closure part (5), by means of which the closure part (5) is so guided that during the opening procedure it lifts from its closure seat in an approximately axial direction and, continuing on from this axial movement, tilts away laterally to the outer wall of the socket-piece (4), wherein the constraining guide is at least one coulisse guide, which includes two complementary parts, namely grooves (24,25) and pegs (31,32,33,34) which engage into the grooves.

2. Closure according to claim 1, wherein the coulisse guide includes two grooves (24,25) into which guide pegs (31,32) engage, respectively, and that both grooves (24,25) include respectively a substantially axial rectilinear extending segment (24a,25a) and one (24) of the two grooves includes a circular-arc-shaped segment (24b) joining on to the axially extending segment (24a).

3. Closure according to claim 2, wherein the two grooves (24,25) run together into a threading-groove segment (26).

4. Closure according to claim 1, wherein the closure part includes a dome (9) fitting on the closure seat and two supports (27,28) extending in the axial direction and arranged laterally on the dome (9), said supports enclosing the socket-piece (4) on both sides in the manner of a fork.

5. Closure according to claim 4, wherein at any given time one part of the coulisse guide is arranged on the outer wall of the socket-piece (4) and the part at any given time complementary thereto is arranged on the inner side of each one of the supports (27,28) which faces the socket-piece.

6. Closure according to claim 4, wherein on at least one of the supports a force-receiving part (29,30) is arranged, upon which forces are exercisable in the axial direction for closing and opening of the closure.

7. Closure according to claim 6, wherein on the force-receiving part (29,30) a frame (14) is linked, which is connected with an activation lever (12).

8. Closure according to claim 7, wherein the activation lever is so arranged in an introduction channel (19) that it is activatable by introduction of a refueling nozzle.

9. Closure according to claim 6, wherein the force-receiving part (29,30) is connected with an axially moveable outer-ring (40).

10. Closure according to claim 9, wherein the force-receiving part is a peg (29) which engages into a circumferential groove (42) of the axially moveable outer ring.

11. Closure according to claim 9, wherein the socket-piece (4) includes a screw-coulisse, in such a manner that it is moveable in the axial direction by turning.

12. Closure according to claim 11, wherein the screw-coulisse consists of two complementary parts, one part consisting of grooves (44) and the other part consisting of pins (43) which engage into the grooves.

13. Closure according to claim 12, wherein the one part of the screw-coulisse is arranged on the outer side of the socket-piece (4) and the part complementary thereto is arranged on the inner side of the outer ring (40).

14. Closure for closing the orifice (6) of a socket-piece (4) with a closure part (5) which is able to depart from its closure seat by swiveling, wherein a constraining guide is provided for the closure part (5), by means of which the closure part (5) is so guided that during the opening procedure it lifts from its closure seat in an approximately axial direction and, continuing on from this axial movement, tilts away laterally to the outer wall of the socket-piece (4), wherein the constraining guide includes a lever-bar 51, wherein the lever-bar 51 includes two turning axles, of which the first represents a fixed mount (52) of the lever-bar (51) and lies laterally at a distance from the socket-piece (4), and of which the second is the linking point of the closure part and runs diametrically through the socket-piece, in such a manner that a swiveling of the lever-bar (51) about the first turning axle (52) works a nearly axial lifting of the closure part (5) and a swiveling of the closure part about the second axle (50) works a lateral tilting away of the closure part (5) to the outer side of the socket-piece (4).

15. Closure according to claim 14, wherein the turning movement about the first turning axle (52) is limited by a stop (53).

16. Closure according to claim 15, wherein a pre-stressed spring (57) is provided, which is stressed by lateral tilting away of the closure part (5).

17. Closure for a petrol tank for closing the orifice (6) of a socket-piece (4) with a closure part (5) which is able to depart from its closure seat by swiveling, wherein a constraining guide is provided for the closure part (5), by means of which the closure part (5) is so guided that during the opening procedure it lifts from its closure seat in an approximately axial direction and, continuing on from this axial movement, tilts away laterally to the outer wall of the socket-piece (4), in which petrol tank the socket-piece (4) is surrounded by a superstructure (7) which includes an introduction channel (19) for a petrol refueling nozzle, wherein the superstructure (7) includes a run-off opening, which is closed when the closure part (5) is laterally tilted away.

* * * * *